United States Patent [19]

Nylund

[11] Patent Number: 4,489,038
[45] Date of Patent: Dec. 18, 1984

[54] FUEL ASSEMBLY FOR A NUCLEAR REACTOR

[75] Inventor: Olov Nylund, Västerås, Sweden

[73] Assignee: AB Asea-Atom, Västerås, Sweden

[21] Appl. No.: 341,978

[22] Filed: Jan. 22, 1982

[30] Foreign Application Priority Data

Feb. 3, 1981 [SE] Sweden .............................. 8100778

[51] Int. Cl.³ .............................................. G21C 3/34
[52] U.S. Cl. .................................. 376/446; 376/438; 376/442
[58] Field of Search ............... 376/442, 441, 438, 439, 376/446, 462, 434, 364; 29/400 N, 402.19, 450, 723

[56] References Cited

U.S. PATENT DOCUMENTS

| | | | |
|---|---|---|---|
| 3,405,033 | 10/1968 | Widell et al. | 376/442 |
| 3,607,639 | 9/1971 | Santen | 376/438 |
| 3,713,974 | 1/1973 | Previti et al. | 376/442 X |
| 3,736,227 | 5/1973 | Nakazato | 376/442 |
| 3,968,008 | 7/1976 | Piepers et al. | 376/446 |
| 4,190,494 | 2/1980 | Olsson | 376/442 X |

Primary Examiner—Richard E. Schafer
Assistant Examiner—Daniel Wasil
Attorney, Agent, or Firm—Pollock, Vande Sande & Priddy

[57] ABSTRACT

A nuclear reactor fuel assembly for a nuclear reactor comprises a housing with a wall and spacer means removably located within the housing, the spacer means comprising a plurality of spacer cells each adapted to receive an elongated fuel rod for the purpose of locating a bundle of such fuel rods in spaced-apart relationship within the housing. A portion of the housing which confronts the spacer means is provided at least at one location with a first locking means, and one of the spacer cells is provided with a second locking means movable between active and inactive positions. This second locking means is prevented from moving past the first locking means in the direction of elongation of the fuel rods when the second locking means is in its active position but is able to move past the first locking means when in its inactive position. The second locking means is moved from its inactive position to its active position by the insertion of a fuel rod into said one spacer cell.

7 Claims, 5 Drawing Figures

FUEL ASSEMBLY FOR A NUCLEAR REACTOR

BACKGROUND OF THE INVENTION

1. Field of the Invention

This invention relates to a fuel assembly for a nuclear reactor, the fuel assembly being of the kind comprising a housing which receives, in a removable manner, a bundle of elongated fuel rods.

2. Description of Prior Art

The housing of a fuel assembly of the kind referred to is normally in the form of a tubular container having a length of several meters. Its cross-section may, for example, be circular or square and it contains a large number of elongated tubular fuel rods, arranged parallel to one another in a certain specified, normally symmetrical, pattern. The fuel rods are held fixed in this pattern by spacer means comprising a plurality of so-called spacers, for example of the kind disclosed in U.S. Pat. No. 3,405,033. The spacers are arranged in spaced relationship to each other along the vertically arranged bundle of fuel rods, and are held in position along the bundle by a certain amount of self-resilience against the individual fuel rods. However, because of the neutron irradiation, the spring force exerted by the spacers decreases and after a few years it is only a fraction of the original spring force. It may then occur that the spacers, under the influence of the flow through the fuel assembly, are displaced upwards, or slide downwards under the influence of gravity, thus leaving long sections of the fuel rod bundle completely unsupported. To avoid this and fix the spacers in the vertical direction, special spacer holder rods have been arranged in parallel with the fuel rods. Each spacer holder rod is provided with stop means embossed at specified distances from each other along the rod, and individual spacers rest against these stop means. In this way, the spacers are retained in the desired position and are prevented from moving along the fuel rods. However, a particular drawback of these spacer holder rods is that they take up space in the fuel rod bundle which could otherwise be used to receive fuel rods, thus reducing the operating economy of the reactor.

Another way of maintaining the distances between the spacers has been to place spacing sleeves between the spacers, these spacing sleeves being arranged to surround the control rod tubes. A further known method is to fix the spacers permanently to the wall of the surrounding housing. However, this involves the complication that the bundle of fuel rods, together with the applied spacers, cannot be withdrawn from the housing as a single unit when refuelling is necessary.

The present invention aims to provide a fuel assembly for a nuclear reactor which does not have the above-mentioned drawbacks of the known fuel rod assemblies.

SUMMARY OF THE INVENTION

According to the invention, in a fuel assembly for a nuclear reactor, which assembly comprises a housing with a wall and spacer means removably located within said housing, each spacer means comprising a plurality of spacer cells each adapted to receive an elongated fuel rod and thereby to locate a bundle of such fuel rods in spaced-apart relationship within the housing, there is provided the improvement wherein a portion of the housing wall confronting the spacer means is provided at least at one location with a first locking means, and one of the spacer cells is provided with a second locking means movable between active and inactive positions. This second locking means is prevented from moving past the first locking means in the direction of elongation of the fuel rods when the second locking means is in its active position but is allowed such movement when the second locking means is in its inactive position. The second locking means is moved from its inactive position to its active position by the insertion of a fuel rod into its spacer cell.

In one embodiment of a fuel assembly in accordance with the invention, the first locking means comprises a plurality of locking members spaced apart in the direction of elongation of the fuel rods and the second locking means moves into its active position between two of the locking members, thereby to limit movement of the spacer means in the direction of elongation of the fuel rods.

The wall of the housing which is provided with the first locking means may be a wall of the housing that surrounds the bundle of fuel rods and/or an internal partition wall of the housing.

The housing of the fuel assembly may be of substantially rectangular cross-section and one of the cells provided with the second locking means may be located adjacent each corner of the housing when the assembly of fuel rods and spacer means is inserted into the housing.

Compared with known fuel assemblies of the kind referred to, a fuel assembly in accordance with the invention has the advantage that the insertion of a fuel rod into the, or each, spacer cell provided with the second locking means will act as a key for the bundle of fuel rods. When the spacer means together with the bundle of fuel rods has been inserted into the housing, the, or each, spacer cell provided with the second locking means may be locked to the housing by inserting a fuel rod into the fuel bundle and be released again by withdrawing this fuel rod from the fuel bundle, whereupon the entire bundle may be removed from the housing for inspection. Thus, by the invention, the use of special spacer holder rods is dispensed with, thus improving the operating economy of the nuclear reactor.

A simple way of making the second locking means movable from its inactive position to its active position is to arrange the second locking means on an outer wall of the spacer means, which wall is intended to be urged by its inherent resilience against one of the fuel rods in a fuel bundle. When the rod is inserted into the spacer means, it makes contact with the resilient wall, and the latter with its associated second locking means is laterally displaced. If the fuel bundle is positioned in the housing of the fuel assembly, this movement of the second locking means is sufficient for it to be brought into a position in which it prevents movement of the spacer past a corresponding first locking means on the wall of the surrounding fuel assembly housing.

BRIEF DESCRIPTION OF DRAWING

The invention will now be described, by way of example, with reference to the accompanying drawing, wherein.

DESCRIPTION OF PREFERRED EMBODIMENTS

Figure 1:
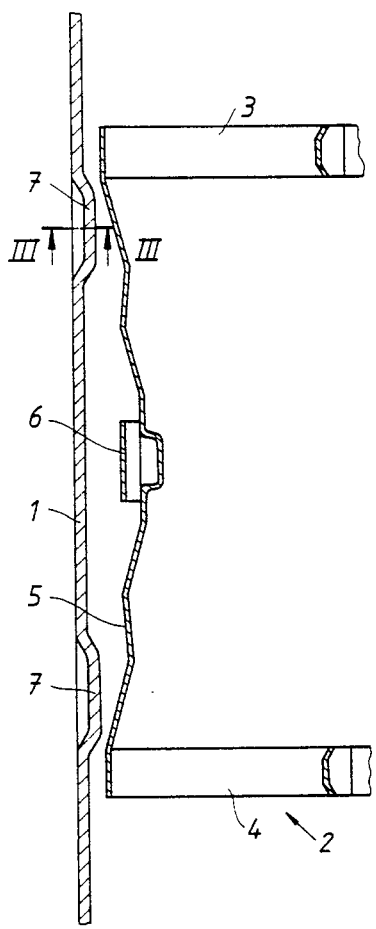
FIG. 1 is a sectional view of part of the housing and part of one spacer of the spacer means of one embodiment of a fuel assembly in accordance with the invention.
Figure 2:
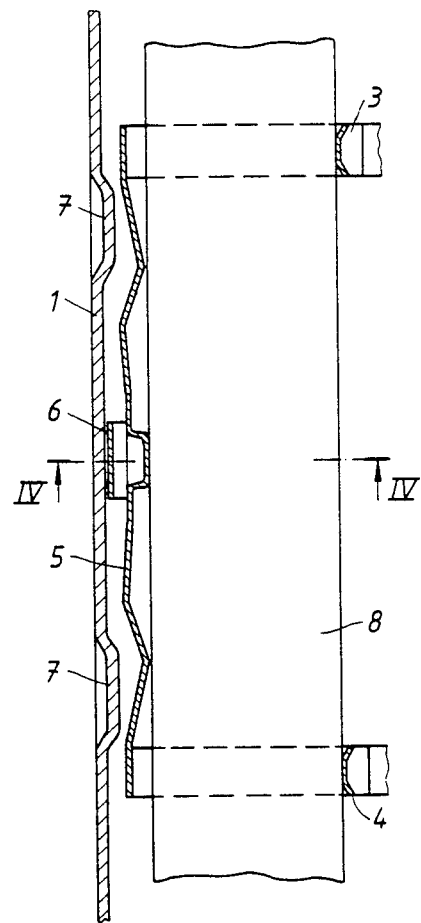
FIG. 2 is a view similar to FIG. 1 but showing a fuel rod inserted into the spacer.
Figure 3:
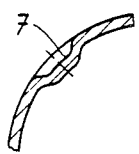
FIGS. 3 and 4 are sectional views taken on the line III—III of FIG. 1 and the line IV—IV of FIG. 2, respectively.
Figure 4:
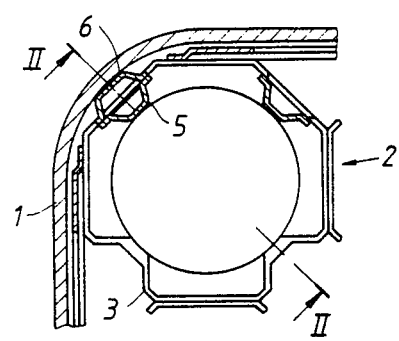
Figure 5:
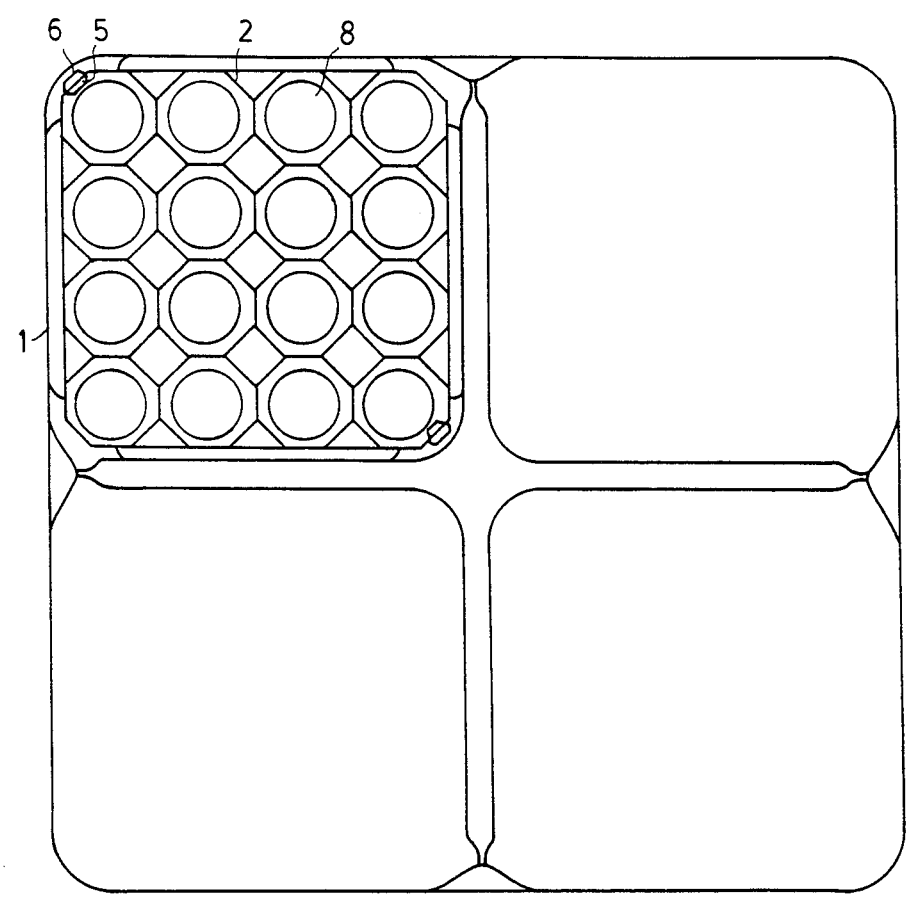
FIG. 5 is a view which shows the reactor fuel assembly.

Referring to FIG. 1, the numeral 1 designates part of the wall of the tubular housing of a fuel assembly for a nuclear reactor and the numeral 2 designates part of one spacer of the spacer means of the fuel assembly. Only a portion of the wall of housing 1 has been shown, for simplicity. Normally there would be a plurality of the spacers 2 arranged in spaced-apart relationship in the longitudinal direction of the tubular housing, each spacer 2 comprising, in known manner, a plurality of spacer cells whereby a bundle of elongated fuel rods (not shown) may be located in spaced-apart, parallel relationship in the tubular housing. Fragments of the adjacent spacer cells are shown in FIGS. 1, 2 and 4. The bundle of fuel rods and its associated spacer means consisting of a plurality of the spacers 2 are insertable into, and removable from, the tubular housing of the fuel assembly as a unit.

One of the spacer cells of the spacer 2 in FIG. 1 comprises an upper frame 3 and a lower frame 4, which are interconnected by a resilient wall or strip 5. In the middle of the strip 5 there is arranged a stop member 6, constituting the aforesaid second locking means. Spaced-apart stop projections 7 are embossed in the wall 1 of the fuel assembly housing, these projections constituting the aforesaid first locking means. In FIG. 1 no fuel rod is inserted into the spacer cell formed by the items 3 to 5, which means that the spacer 2 can be removed from the fuel assembly housing without the stop member 6 contacting any of the projections 7. The stop member 6 is therefore in its aforesaid inactive position.

In FIGS. 2 and 4, a locking or fuel rod 8 has been inserted into the spacer cell formed by the items 3 to 5, thus urging the resilient strip 5 towards the wall 1 of the fuel assembly housing. This in turn has resulted in movement of the stop member 6 from its inactive position (shown in FIG. 1) to an active position shown in FIGS. 2 and 4 where it is positioned so close to the wall 1 that the spacer 2 cannot be moved upwards or downwards to any substantial extent without the stop member 6 abutting against one of the projections 7.

When the spacer means of the fuel assembly comprises a plurality of the spacers 2 arranged in spaced-apart relationship, one above another, in the tubular housing of the fuel assembly, each spacer 2 comprises at least one spacer cell provided with the stop member 6, such spacer cells being aligned with one another in the axial direction of the tubular housing of the fuel assembly. A single fuel rod can then be inserted through these aligned spacer cells to move their respective stop members 6 from inactive positions to active positions in relation to the stop projections 7.

When the fuel assembly comprises a tubular housing of generally square cross-section, it is convenient for each spacer 2 to include four of the cells provided with a stop member 6, one such cell being positioned adjacent each corner of the tubular housing, as shown for one corner in FIG. 4. If the fuel bundle is divided into different parts, each one provided with individual spacers, these spacers have to be locked separately to the housing wall or a partition wall in the housing by the insertion of a corresponding fuel rod.

What is claimed is:

1. In a nuclear reactor fuel assembly of the type including a housing wall and spacer means removably located within said housing wall, said spacer means comprising a plurality of spacer cells each adapted to receive an elongated fuel rod and thereby to locate such fuel rods in spaced-apart relationship within said housing wall, the improvement comprising:
   a portion of said housing wall confronting said spacer means being provided at least at one location with a first locking means; and
   one of said spacer cells being provided with a second locking means, movable between active and inactive positions in response, respectively, to insertion and removal of a fuel rod into and from said one spacer cell, for preventing said second locking means from moving past said first locking means in the direction of elongation of said fuel rods when said second locking means is in its active position but for allowing said second locking means to move past said first locking means when said second locking means is in its inactive position.

2. A fuel assembly according to claim 1, wherein said first locking means comprises a plurality of locking members spaced apart in the direction of elongation of said fuel rods and said second locking means moves into its active position between two of said locking members, thereby to limit movement of said spacer means in the direction of elongation of said fuel rods.

3. A fuel assembly according to claim 1 or claim 2, wherein said housing wall surrounds said fuel rods.

4. A fuel assembly according to claim 1 or claim 2, wherein said housing wall is an internal partition wall of said housing.

5. A fuel assembly according to claim 1 or claim 2, wherein said spacer means comprises a plurality of said cells provided with said second locking means.

6. A fuel assembly according to claim 5, wherein said housing is of substantially rectangular transverse cross-section and one of said cells provided with said second locking means is located adjacent to each corner of said housing when the assembly of fuel rods and spacer means is inserted into said housing.

7. A fuel assembly according to claim 1 or claim 2, wherein said one spacer cell comprises a resilient wall on which said second locking means is mounted.

* * * * *